No. 690,749. Patented Jan. 7, 1902.
J. MATHEWS.
ELEVATOR DOOR.
(Application filed Feb. 4, 1901.)
(No Model.) 2 Sheets—Sheet 1.
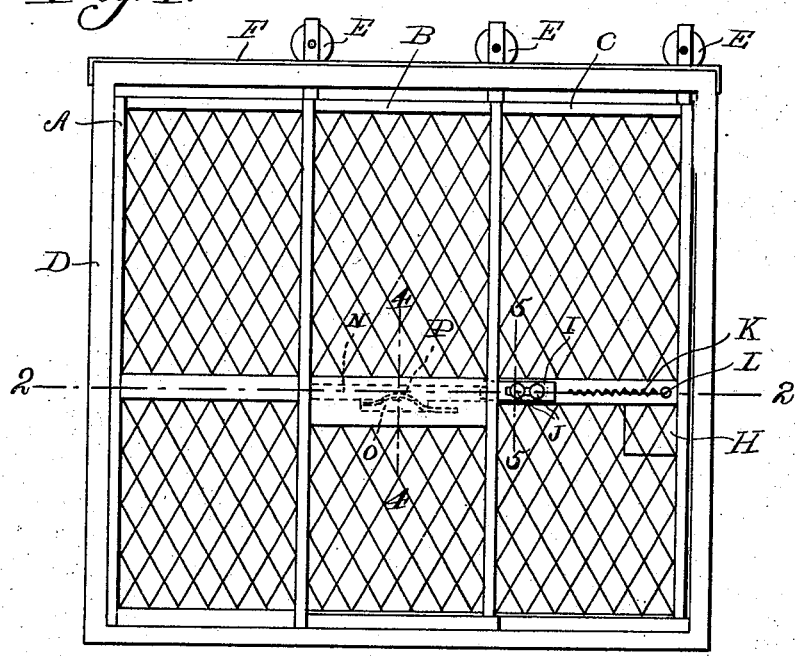
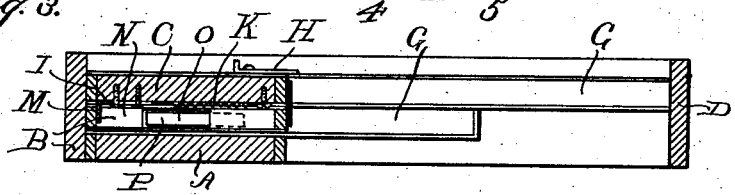
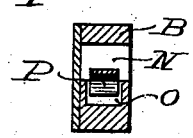 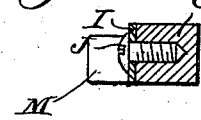
Witnesses:
E. F. Wilson
John Snowhook
Inventor:
John Mathews
By Rudolph ... Atty.

No. 690,749. Patented Jan. 7, 1902.
J. MATHEWS.
ELEVATOR DOOR.
(Application filed Feb. 4, 1901.)
(No Model.) 2 Sheets—Sheet 2.
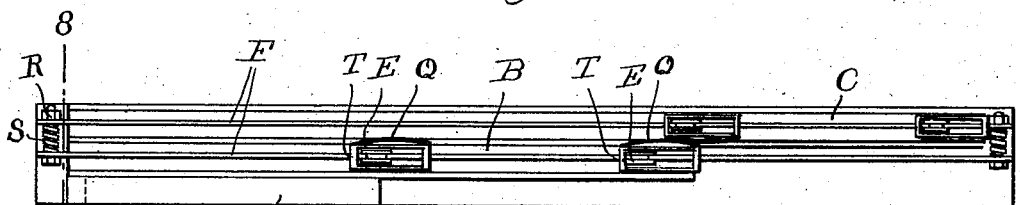
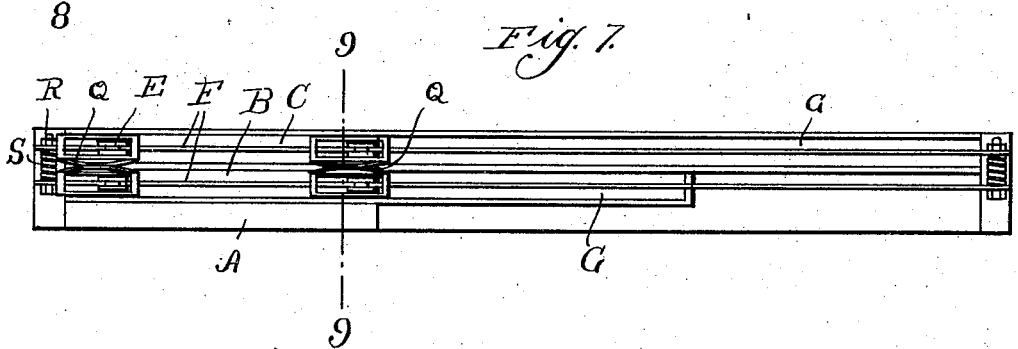
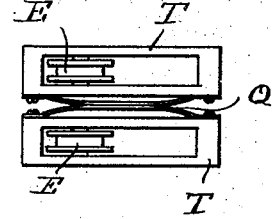
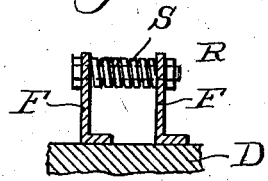
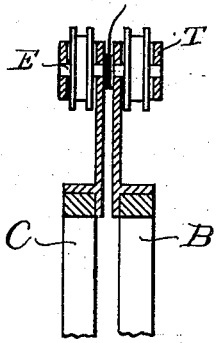
Witnesses:
E. F. Wilson
John Snowhook
Inventor:
John Mathews
By Rudolph M. Foss
Atty.

UNITED STATES PATENT OFFICE.

JOHN MATHEWS, OF CHICAGO, ILLINOIS.

ELEVATOR-DOOR.

SPECIFICATION forming part of Letters Patent No. 690,749, dated January 7, 1902.

Application filed February 4, 1901. Serial No. 45,943. (No model.)

*To all whom it may concern:*

Be it known that I, JOHN MATHEWS, a citizen of the United States, residing at Chicago, in the county of Cook and State of Illinois, have invented certain new and useful Improvements in Elevator-Doors; and I do hereby declare the following to be a full, clear, and exact description of the invention, such as will enable others skilled in the art to which it appertains to make and use the same.

My invention relates to a novel construction in an elevator-door, the object being to provide a door which will open two-thirds its width, thereby permitting easy access to and exit from the elevator, thus avoiding the crowding and jamming now so common; and it consists in the features of construction and combinations of parts hereinafter fully described and claimed.

In the accompanying drawings, illustrating my invention, Figure 1 is a view in elevation from the outer side of an elevator-door constructed in accordance with my invention. Fig. 2 is a horizontal section of same on the line 2 2 of Fig. 1. Fig. 3 is a similar section on the line 2 2 of Fig. 1, showing the door in its open position. Fig. 4 is a detail vertical section on the line 4 4 of Figs. 1 and 2. Fig. 5 is a detail vertical section on the line 5 5 of Figs. 1 and 2. Fig. 6 is a top plan view showing a modified form of hanger. Fig. 7 is a view similar to Fig. 6, showing the movable sections in their opened position. Fig. 8 is a detail section on line 8 8, Fig. 6. Fig. 9 is a detail section on line 9 9, Fig. 7. Fig. 10 is an enlarged top plan view of two of the door-hangers.

My said device consists of three parts A, B, and C, respectively, all of practically equal width. The part A is rigidly mounted in one end of the door-frame D, and the parts B and C are slidably mounted in said frame, being supported by the roller-hangers E, running on guide-rails F and also guided at their lower ends in the guide-grooves G in the threshold. The part or member C carries the latch H, of ordinary construction, by means of which it is locked rigid with the frame D. Said member C carries a slotted plate I, which is longitudinally movable thereon and guided by means of set-screws or other suitable devices J, passing through said slot, and which at the same time form stops to limit the movements of said plate in either direction. A spring K, interposed between the forward end of said plate I, and a projection L on the forward end of said member C tend to hold said plate I at one limit of its movement. The rear end of said plate I is provided with a flange M, which projects into a longitudinal groove N in the member B and is almost equal in width to said groove N. A recess O extends downwardly from said groove N and contains a flat spring P, which is bent between its ends so as to project into the groove N and into the path of said flange M of said plate I.

The operation of the door is as follows: When the member C is released and moved rearwardly, said flange M of said plate I is first brought into engagement with said spring P and in passing same creates sufficient friction to start said member B in its rearward movement without jarring the same. As the impetus thus imparted to said member B is sufficient to keep same moving until the said flange M strikes the rear end wall of said groove N, a very light push from said flange will cause said member B to move to complete its rearward movement, together with said member C. The members A, B, and C will then be practically flush with each other, leaving a very large opening for the passage of passengers. In closing the door the action of the flange M and spring P is the same as in opening. As said member B reaches the forward limit of its movement, however, it also limits the movement of the plate I, so that as said member C approaches the closed position the spring K will be expanded. The spring K thus acts to retard the movement of the member C and cushions its blow upon the door-frame. Said spring K also serves to start said member C in its rearward motion when the latch is released.

The plate I is moved to the rearward limit of its movement with relation to the member C by the engagement of its flange M with said member B when the door is closed, and said member B is thus held at the forward limit of its movement (which is determined by its guide-groove in the threshold or by other suitable stops) and remains locked in said position so long as the member C is locked.

A door constructed as above is very easily operated and being very simply constructed does not get out of order.

In Figs. 6 to 10, inclusive, of the drawings I have illustrated a modified form of my yielding spring-contact device.

The roller-hangers E are each provided with an elliptical spring Q, secured to the side of the frame R, which carries the roller E. The springs on the hangers on said member C are adapted to engage those on the hangers which support said member B with a yielding contact as said member C is moved backward and forward, and thus impart motion to said member B from the movement of said member C without shock or jar. To provide an adjustment so that said springs Q may be brought into contact with the proper degree of pressure, the ends of said rails F are adapted to be drawn together by means of the bolts S, the spring-washers T being introduced on said bolts between said rails F to hold said rails firmly in place.

I claim as my invention—

1. An elevator-door having two movable members moving in planes parallel with each other and adapted by their combined widths to close an entrance, and means for transmitting motion from one to the other of said members, said means including a yielding stop on one member adapted to project into the path of a part of the other member, said part on said last-named member being adapted, in passing said yielding stop, to produce sufficient friction to start said first-named member in motion.

2. An elevator-door comprising two movable members of practically equal widths, said movable members being movable in planes parallel with each other, means for limiting the movements of said movable members, a spring-actuated plate carried by one of said movable members and movable thereon, and stops carried by the other of said movable members and adapted to be engaged by said plate to move said last-named movable member to either limit of its movement simultaneously with said first-named member.

3. The combination with a door-frame, of three members of practically equal width adapted by their combined widths to fill and close said door-frame, one of said members being rigidly mounted in one end of said frame and the other members being movable in guides in said frame, means for limiting the movements of said movable members in both directions, and means carried by said movable members for transmitting motion from one to the other thereof, said means comprising a longitudinal groove in one member, a yielding stop projecting into said groove, a projection carried by the other movable member and projecting into said groove, said projection being adapted to engage said yielding stop and force same out of its path, thereby starting into motion the member carrying said stop and subsequently to engage one of the end walls of said groove to cause said last-named member to move with said first member to the limit of motion of said member carrying said projection.

4. The combination with a door-frame, of three members of practically equal width adapted by their combined widths to fill and close said door-frame, one of said members being rigidly mounted in one end of said frame, and the other members being movable in guides in said frame, means for limiting the movements of said movable members in both directions, and means carried by said movable members for transmitting motion from one to the other thereof, said means comprising a longitudinal groove in one member, a yielding stop projecting into said groove, a spring-actuated projection carried by the other member normally held at one limit of its movement and projecting into said groove, said projection being adapted to engage said yielding stop and force the same out of its path, thereby starting the member carrying said stop into motion, and subsequently to engage one of the end walls of said groove to cause said last-named member to move to the limit of its motion simultaneously with said member carrying said projection.

5. The combination with a door-frame, of three members of practically equal width adapted by their combined widths to fill and close said door-frame, one of said members being rigidly mounted in one end of said frame and the others being movably mounted therein, means for limiting the movements of said movable members, and means carried by said members for transmitting motion from one to the other thereof, said means comprising a longitudinal groove in one member, a yielding stop projecting into said groove, a spring-actuated projection carried by the other member and projecting into said groove, said projection being adapted to engage said yielding stop and force the same out of its path, thereby starting said grooved member in motion, and adapted subsequently to engage one of the end walls of said groove to cause said grooved member to move to either limit of its motion simultaneously with said other member, said projection being moved to the rearward limit of its motion against the action of its spring when the member carrying the same reaches its closed position, thereby retarding its motion and cushioning the blow upon the door-frame and acting to start said member rearwardly when released.

6. In a device of the kind specified, the combination with a door-frame and two movable door members, the latter being movable in guides, of means for limiting the movements of said movable members, and means carried by one of said movable members for transmitting motion from one to the other thereof, said means including a yielding stop carried by one of said members, a projection carried by the other thereof and adapted to engage said yielding stop, and a spring engaging said projection to produce yielding engagement between said movable members, said spring being adapted to cushion the final movement of the member carrying said projection to its forward limit and to start said member rearwardly when released.

7. In a device of the kind specified, the combination with a door-frame and two movable door members, the latter being movable in guides, of means for engaging one of said movable members with the other thereof with a yielding spring-contact whereby said second member will be started into motion without shock or jar and will be caused to move to the limit of its motion simultaneously with said first-mentioned member.

In testimony whereof I affix my signature in presence of two witnesses.

JOHN MATHEWS.

Witnesses:
E. F. WILSON,
JOHN SNOWHOOK.